US008666983B2

(12) United States Patent
Brill et al.

(10) Patent No.: US 8,666,983 B2
(45) Date of Patent: Mar. 4, 2014

(54) ARCHITECTURE FOR GENERATING RESPONSES TO SEARCH ENGINE QUERIES

(75) Inventors: Eric D. Brill, Redmond, WA (US); Soumya Ray, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 3020 days.

(21) Appl. No.: 10/460,955

(22) Filed: Jun. 13, 2003

(65) Prior Publication Data

US 2004/0254917 A1 Dec. 16, 2004

(51) Int. Cl.
*G06F 17/30* (2006.01)

(52) U.S. Cl.
USPC ............................................ 707/737; 707/736

(58) Field of Classification Search
USPC .................................... 707/3, 5, 102, 736, 737
See application file for complete search history.

(56) References Cited

U.S. PATENT DOCUMENTS

| 5,384,894 | A | 1/1995 | Vassiliadis et al. |
| 5,933,822 | A | 8/1999 | Braden-Harder et al. |
| 6,006,217 | A | 12/1999 | Lumsden |
| 6,006,218 | A | 12/1999 | Breese et al. |
| 6,028,601 | A | 2/2000 | Machiraju et al. |
| 6,041,326 | A | 3/2000 | Amro et al. |
| 6,182,065 | B1 | 1/2001 | Yeomans |
| 6,236,958 | B1 * | 5/2001 | Lange et al. ...................... 704/8 |
| 6,466,899 | B1 | 10/2002 | Yano et al. |
| 6,487,553 | B1 | 11/2002 | Emens et al. |
| 6,539,376 | B1 | 3/2003 | Sundaresan et al. |
| 6,587,848 | B1 | 7/2003 | Aggarwal et al. |
| 6,601,075 | B1 | 7/2003 | Huang et al. |
| 6,633,846 | B1 * | 10/2003 | Bennett et al. ................. 704/257 |
| 6,665,666 | B1 * | 12/2003 | Brown et al. ...................... 707/5 |
| 6,745,161 | B1 * | 6/2004 | Arnold et al. ...................... 704/7 |
| 6,836,773 | B2 * | 12/2004 | Tamayo et al. .................... 707/6 |
| 6,941,321 | B2 | 9/2005 | Schuetze et al. |
| 2002/0065845 | A1 * | 5/2002 | Naito et al. ................. 707/500.1 |
| 2003/0018629 | A1 * | 1/2003 | Namba ............................. 707/3 |
| 2003/0144994 | A1 * | 7/2003 | Wen et al. ......................... 707/3 |
| 2004/0076936 | A1 * | 4/2004 | Horvitz et al. ................. 434/236 |
| 2004/0243568 | A1 * | 12/2004 | Wang et al. ........................ 707/3 |
| 2004/0260692 | A1 | 12/2004 | Brill et al. |

OTHER PUBLICATIONS

Article entitled "Clustering User Queries of a Search Engine" by Wen et al. (dated May 5, 2001).*
U.S. Appl. 11/336,360, Brill, et al.
S. Dumais, et al, "Web Question Answering: Is More Always Better?", Proceedings of the 25th annual ACM SIGIR Conference, 2002, pp. 291-298.
Mei Kobayashi, et al., "Information Retrieval on the Web", ACM Computing Surveys, 2000, pp. 144-173, vol. 32, Issue 2.

(Continued)

*Primary Examiner* — Mahesh Dwivedi
(74) *Attorney, Agent, or Firm* — Lee & Hayes, PLLC

(57) ABSTRACT

Architecture for generating responses to search engine queries. Question/answer pairs are used to provide a predefined question hierarchy to facilitate a search. Informative terms and one or more questions are associated with each question node of the hierarchy. A question posed is mapped into the hierarchy to the most similar question class node, as determined by passages of the question and/or comparing the informative terms of the question and the question/answer node. Weighted informative terms associated with that node are then returned, and can be used by an automatic question answering system to more effectively find an answer to a question.

40 Claims, 9 Drawing Sheets

(56) References Cited

OTHER PUBLICATIONS

A. Arasu, et al., "Searching the Web", ACM Transactions on Internet Technology, 2001, pp. 2-43, vol. 1 Issue 1.

Jonathan Foote, et al., "Audio Retrieval by Rhythmic Similarity", Proceedings of the 3rd Annual Conference on Music Information Retrieval, IRCAM-Centre Pompidou, 2002, 2 pages.

Seiji Yamada and Fumihiko Murase. Intelligent User Interface for a Web Search Engine by Organizing Page Information Agents. Proceedings of the 7th International Conference on Intelligent User Interfaces. pp. 230-231. 2002.

Jimmy Lin, Dennis Quan, Vineet Sinha, Karun Bakshi, David Huynh, Boris Katz, and David R. Karger. The Role of Context in Question Answering Systems. ACM Conference on Human Factors and Computing Systems, pp. 1006-1007, 2003.

Cody Kwok, Oren Etzioni, and Daniel S. Weld. Scaling Question Answering to the Web. ACM Transactions of Information Systems, vol. 19 Issue 3, Jul. 2001, pp. 242-262.

Eric Brill, Susan Dumais, and Michele Banko. An Analysis of the AskMSR Question-Answering System. Microsoft Research. 8 pages.

Eric Brill, Jimmy Lin, Michele Banko, Susan Dumais, and Andrew Ng. Data-Intensive Question Answering. Microsoft Research. 8 pages.

* cited by examiner

ARCHITECTURE FOR GENERATING RESPONSES TO SEARCH ENGINE QUERIES

TECHNICAL FIELD

This invention is related to data query systems, and more specifically, to automatic question answering in information retrieval systems.

BACKGROUND OF THE INVENTION

The advent of the Internet and the capability of accessing large local and widely distributed sources of information have facilitated increasing attention for ways in which to search or mine such information. The Internet may be viewed as a gigantic data repository with tremendous redundancy that can be exploited for information retrieval. Thus typical data retrieval systems retrieve large numbers of documents relevant or even irrelevant to a search query.

Automatic question answering is a very useful sub-problem associated with information retrieval. A goal of a question-answering system is to provide a concise answer to a natural language question. Instead of deluging the user with a long list of documents possibly containing relevant information buried within, automatic question answering attempts to directly answer the user question by extracting the answer from one or more documents rather than returning a collection of documents that may contain relevant or even irrelevant information. Most conventional systems are designed to perform question answering by using extensive knowledge engineering in the form of handwritten patterns which contain the answer given template that matches a question, or very detailed natural language processing, or a combination of both. Automatic question answering typically works by first locating a number of text passages from a (typically very large) text collection that contain potential answers, and then extracting the answers from this collection of passages.

Most automatic question answering systems work by defining a set of question types, building recognizers that automatically assign a question to one or more question types, and then using hints based on the question type and the question itself for finding answers to questions of that type. For example, there may be a question type: <Person's Birth Date> to which question of the form: "When was . . . born?" is assigned. An answer hint for this question type might be that given a question "When was X born?", if the system finds a string "X was born on <DATE>", then <DATE> is likely to be the answer to the question.

Generally, given a question Q and some text T, it is desired to assess the probability that T contains an answer to Q. If Q="Who is Bill Gates married to?", and T contains the string " . . . Bill Gates is married to . . . ", then T is likely to contain an answer. A case like this can be solved by query rewrites, that is, given a question, search for strings that are part of a declarative sentence answering the question. For example, "Where is the Louvre?"→"the Louvre is located in"; and "Who was the third American president?"→"the third American president was".

However, finding answers by rewriting a question into a partial declarative answer only partly solves the problem. Often, answers appear in a less straightforward relation to the question. For example, the sentence: "Bill and Melinda Gates have three children" contains the answer to the question "Who is Bill Gates married to", although the relation between question and answer string is a more subtle.

A deficiency in conventional systems is that there is no learning capability. The system handles the nth question of some type in the same way as the question would be handled if processed first. Thus a question that when rewritten provides little or no straightforward relationship to a potential answer poses a significant problem to conventional systems.

What is needed is a system that can process through such non-straightforward queries and learn their subtle nuances such that when given a question of similar type, the system would use those now known terms to improve accuracy on the new question.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture for generating responses to search engine queries. More specifically, the architecture improves automatic question answering by learning cues to help find an answer to a given question. Typical search engine question query results include a listing of a number of documents that may include information responsive to the query question. However, the present invention includes a more flexible framework for providing textual answers to question queries with information extracted from textual passages. Any question/answer pairs may be used to construct a question/answer hierarchy. For any question/answer pair, informative terms are found to which clustering techniques may be applied to group the question/answers that are deemed the most similar. That is, not only will there be multiple nodes of questions and associated informative terms, there may also be nodes that have two or more questions associated therewith and the list of informative terms. The informative terms are weighted to provide the system with terms that are more likely associated with the nodal questions. Thus when a query is posed to the system, the weighted informative terms may be used against the returned results to find those results that are more likely to contain the answer to the query. Alternatively, the informative terms may be used in the search in response to which the results are returned and processed. When a question is posed, the invention maps the query question into the abstraction hierarchy to use informative terms from the hierarchy to answer the query question.

Answers may be found even when not contained in a string that has a straightforward relation to the question string. For example, an answer to a question of the form "Who is X married to" often occurs in a related text segment containing words such as "honeymoon", "wife", and "children", words that are not typically straightforward in finding. However, this can be learned automatically. Thus in another aspect of the present invention, a question posed in a not so straightforward format may be processed and mapped into the abstraction hierarchy according to the distribution of terms found in potential answer passages for the question. The terms are then compared to terms at the various nodes of the hierarchy to find a potential matching question class node in the hierarchy. The quality of any potential answer passage may be assessed by estimating, for a particular question, the probability that this passage contains an answer to the question. This allows the combining of information sources and estimation of the likelihood of an answer being correct in a principled way. Additionally, the system can be trained automatically from the data, obviating the need for a person to laboriously handauthor potential answer cues for all possible question types. As before, the informative terms may be weighted to improve the prospects of finding the correct answer to the question.

In still another aspect thereof, a question may be posed to which no appropriate node in the hierarchy is found. If the system knows the answer to the question, or has some implicit knowledge of the answer (indicated by the user who asked the question or the system's certainty as to the answer it provided), the system then automatically assigns this question to a new hierarchy branch, which may be added to as similar questions and answers are derived. As the hierarchy grows, the system may automatically rebuild the hierarchy to facilitate efficient processing thereof.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
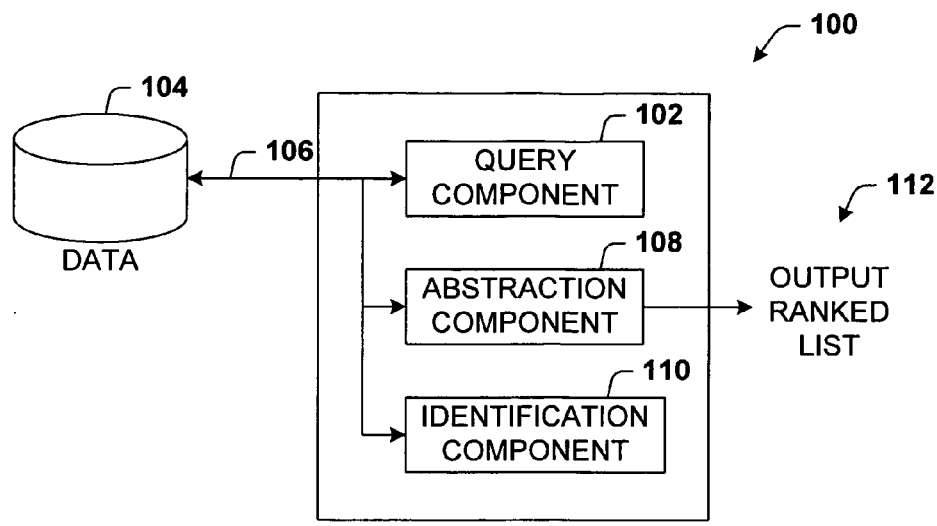
FIG. 1 illustrates a general block diagram of a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The disclosed invention addresses the problem of lending indicators of a good candidate answer passage, even in cases where there is no straightforward relationship between the question and these indicators. For example, if a user presents the query "Who is Bill Gates married to", a text passage that contains the words "Bill", "Gates" and "married" is a good candidate passage for containing an answer. An answer passage that contains the string "Bill Gates is married to" is an even better candidate passage. Conventional techniques can handle both of these cases. However, there are other non-straightforward answer text patterns, such as " . . . have three children and live in Redmond, Wash.", which is also a good candidate passage, but which conventional systems cannot effectively process.

The disclosed architecture effectively learns such non-straightforward question/answer-indicator textual relationships to arrive at a good potential answer. Where the question hierarchy already exists, as provided in an application or program, a question is mapped into a node of the hierarchy, and then the informative terms from that node are used to give answer indicators for the question. As mentioned above, these answer indicators can both help in the search for passages that possibly contain answers, as well as assessing for each individual passage the probability that the passage contains an answer to the question. Additionally, the disclosed invention could also be used to improve generic information retrieval.

Referring now to FIG. 1, there is illustrated a general block diagram of a system 100 of the present invention. The system 100 includes a search component 102 for searching a dataset 104. The search component 102 may receive a query (or search request) from any of a number of different sources, for example, a browser program, a local program application of the system c for searching common application files, help and support search engines, site search engines, and a remote application for searching a local database. A query is a string of one or more terms characterizing a user's information need. Documents are also characterized by key-terms (selected from within the document). The search component 102 processes the search request against the dataset 104 to return one or more result(s).

In the context of question answering while searching on the Internet, or a network that provides a large resource of data and documents either distributed or in a single location, the query result may be a number of answers retrieved from web pages of information, the content of which is associated with the search terms. In a database, the answer results may be retrieved from tables of information each of which is associated with the search terms. In an application, for example, a word processing application, the answer results may be retrieved from a number of application documents the contents of which are associated with the search teens. In the context of this description, the term "answer" is implied to be associated with a question/answer regime. Thus the answer does not include a document per se, but reduced set of word in a string.

The query component 102 interfaces to the dataset 104 (or any number of datasets 104) via a communication medium 106 which may be a wired and/or wireless network including, but not limited to a LAN, WAN, WWAN, and a global communication network (e g., the Internet).

The system 100 also includes an abstraction component 108 that maps the query into an abstraction hierarchy to facilitate identifying answer indicator terms (i.e., the informative terms) to the query. The system 100 also includes an identification component 110 that maps data pairs to the abstraction hierarchy to facilitate identifying informative terms of a set of nodes of the abstraction hierarchy.

Once the query is processed by the query component 102, the system 100 utilizes the abstraction component and the identification component to output one or more answers 112. Where a plurality of answers are provided, a ranking system may be employed to rank the most likely correct answers such that the user perceives those answers first, e.g., in descending order.

Figure 2:
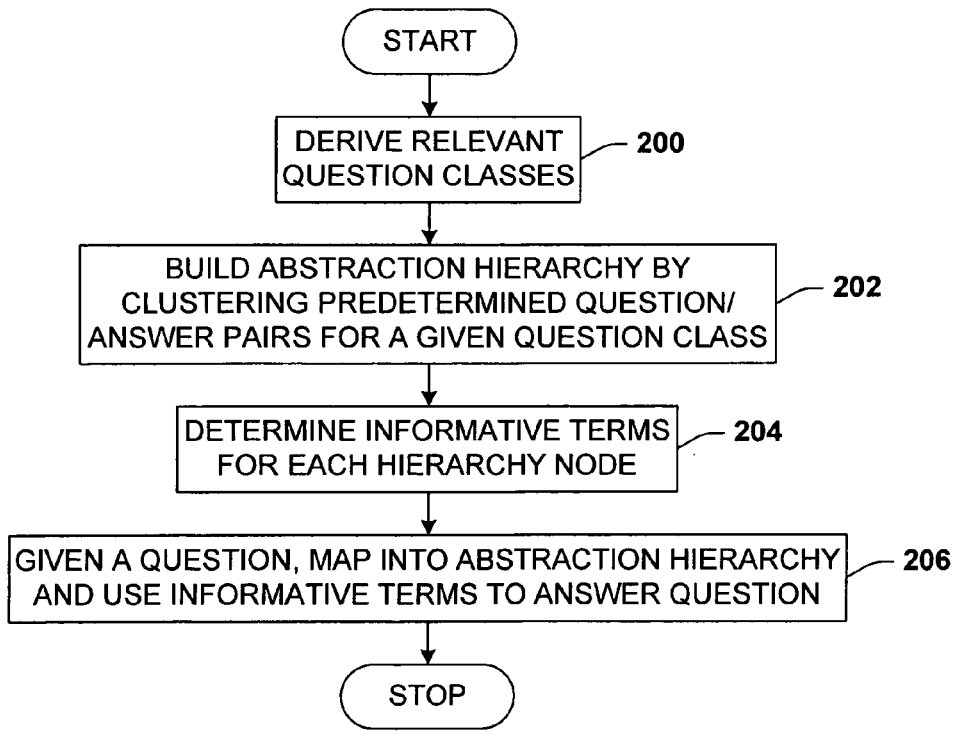
FIG. 2 illustrates a flow chart of the general process for automatically generating an abstraction hierarchy in accordance with the present invention.

Referring now to FIG. 2, there is illustrated a flow chart of the general process for automatically generating an abstraction hierarchy in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, question classes are derived in preparation for creating an abstraction hierarchy for each question class. Such classes include, Who, What, Where, When, How-many, etc. At 202, an abstraction hierarchy is constructed for each question class. Each class hierarchy is further structured with a number of different nodes according to clusters of informative terms derived from question/answer pairs. The question classes and nodes thereof may be provided by manually installing a predetermined set of question classes for use by the system, and/or may include some probabilistic or statistical learning mechanism that facilitates updating an existing question class structure according to implicit and explicit learning means. This is described in greater detail hereinbelow.

At 204, a set of informative terms are derived and assigned to respective question nodes. Initially, this may be performed manually. Subsequently, this process may include in lieu of or in addition to, providing some probabilistic or statistical learning mechanism that facilitates automatically updating the listing of informative terms for each node according to implicit and explicit learning means. At 206, when a query is received in the form of a question, the question or string portions thereof are mapped into the abstraction hierarchy. That is, terms or strings of terms in the question itself may be used to find the most similar question in the question hierarchy. The informative terms from the node are then used to find the answer. Another way is to define informative terms for the posed question, and use these terms to find similar informative terms at a node in the abstraction hierarchy. The informative terms associated with the node are then used to answer the question. The process then reaches a Stop block.

Figure 3:
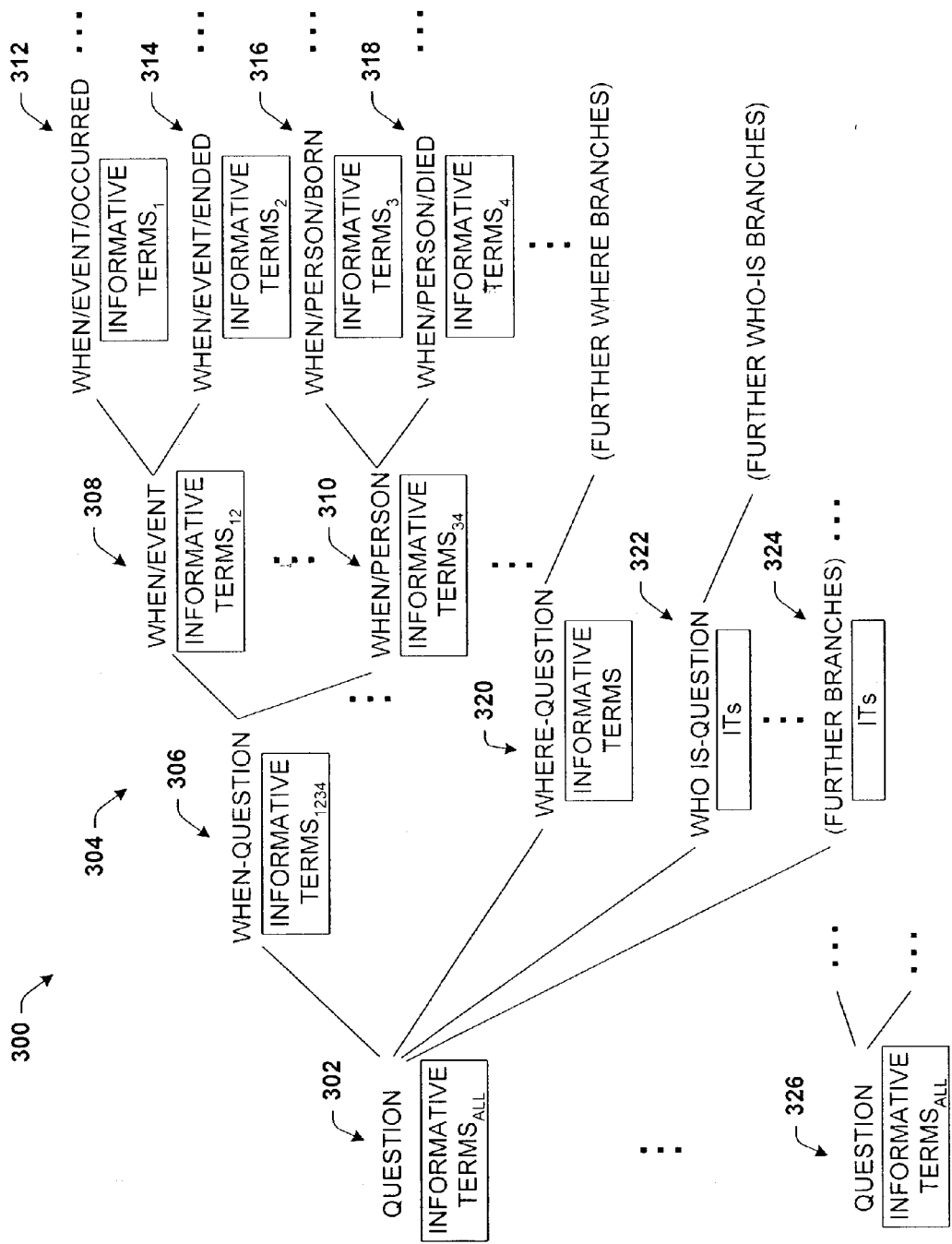
FIG. 3 illustrates a diagram of an abstraction hierarchy fragment according to the present invention.

Referring now to FIG. 3, there is illustrated a diagram of an abstraction hierarchy fragment 300 according to the present invention. A base assumption behind construction of the hierarchy is that similar questions have similar answer indicators, whether these are question terms or informative terms. Any conventional clustering technique may be used to cluster the questions based on the similarity of the indicators. Thus given a number of question/answer pairs with which to create a question hierarchy, similar questions may be clustered such that multiple similar questions are assigned to a single node, or similar questions are clustered closely within the hierarchy. A QUESTION node 302 is defined as the root node for all questions posed to the system. All question classes emanate from the root node 302. In this particular embodiment, the QUESTION root node 302 is expanded out to an associated WHEN class question branch 304. Thus a WHEN-QUESTION child node 306 follows directly from the root parent node 302. Each node in the hierarchy 300 has a subset of the training questions mapped into it, and the informative terms for a node can be computed using the question/answer pairs contained in the node. Some or even all nodes may have multiple associated questions, since some questions may be very similar in text.

In this example, the QUESTION node 302 is the root node and, in this particular embodiment, may contain a listing of all of the informative terms for the child nodes emanating therefrom, although this is not required. In accordance with conventional tree searching algorithms, the search process may begin not at the root node, but at a child node within the hierarchy based upon the questions and/or informative terms associated with any given node. The WHEN-QUESTION node 306 contains a subclass of questions that are asking about a time. Branching from the WHEN-QUESTION node 306 is a WHEN-EVENT node 308 that contains a subset of questions asking about an event time, a WHEN/PERSON node 310 contains subsets of questions related to time and a person, and so forth. The WHEN/EVENT node 308 further branches into a WHEN/EVENT/OCCURRED node 312 and a WHEN/EVENT/ENDED node 314. The WHEN/PERSON node 310 further branches to a WHEN/PERSON/BORN node 316 and a WHEN/PERSON/DIED node 318.

Branching is extensible. Thus the hierarchy 300 is not limited to the illustrated nodes. For example, a third WHEN/ANIMAL node (not shown) may also branch from the WHEN-QUESTION node 306 for questions seeking answers related to pets, or other classes of animals. As illustrated, the nodes 312, 314, 316, and 318 may be extended with further nodes that are not shown. Similarly, each of the nodes 308 and 310 may include more nodes, which are not shown. Still further, the question class node 306 may branch to more nodes, which nodes are not shown. However, as indicated above, there may be limits placed on the number of nodes associated with a question class branch such that system processing is more efficiently utilized. This is described in greater detail hereinbelow.

Each of the nodes 302, 306, 308, 310, 312, 314, 316, and 318 has associated therewith informative terms that aid the system in processing the question down the correct branch path. Subscripts are used to illustrate the cumulative effect at the parent node of informative terms attached to the child nodes. The WHEN/EVENT/OCCURRED node 312 has an Informative Terms$_1$ list, the WHEN/EVENT/ENDED node 314 has an Informative Terms$_2$ list, the WHEN/PERSON/BORN node 316 has an Informative Terms$_3$ list, and the WHEN/PERSON/DIED node 318 has an Informative Terms$_4$ list. The WHEN/EVENT node 308 is parent to both child nodes 312 and 314. Thus the parent node 308 has an Informative terms$_{12}$ list, indicating that the terms in both Informative Terms$_1$ and Terms$_2$ lists of the child nodes 312 and 314 are included therein. Similarly, the WHEN/PERSON node 310 is parent to both child nodes 316 and 318. Thus the parent node 310 has an Informative Terms$_{34}$ list, indicating that the terms in both Informative Terms$_3$ and Terms$_4$ lists of the child nodes 316 and 318 are included therein. This continues up the branch 304 to the parent node 306, which has an Informative Terms$_{1234}$ list that includes all of the later informative terms of its child nodes. Again, this is not required, as each node may only contain those informative terms for that node, and not the cumulative effect from each child node.

Other question classes that may be added to the root node 302 include, but are not limited to, "who", "what", "where", "who is", and "how", each of which may have an extended branch of more detailed answer choices and informative terms associated therewith. Thus a WHEN-QUESTION node 320 may extend from the root node 302, along with a WHO-IS-QUESTION node 322, and any number of further nodes, denoted by a FURTHER-BRANCHES node 324.

In support thereof, the root node 302 contains an Informative Terms$_{All}$ list of all the informative terms of the child nodes. This includes the WHERE-QUESTION node 320, WHO-IS-QUESTION node 322, and FURTHER-BRANCHES node 324 such that the system can map the question to the question root node 302 with the greatest probability of containing the correct answer to the question posed by first examining the Informative Terms$_{ALL}$ list.

Consider the following example for a conventional system that lacks the capabilities of the present invention, where there is provided a set of questions of the form "Who is X married to?", along with answers. The system could automatically learn what strings of terms in the question are good indicators of the presence of an answer to this type of question. One way of accomplishing this is to first collect a set of text passages, some of which contain answers to the question therein, and some of which do not. For instance, an information retrieval engine could be used to retrieve all documents that contain at least two non-stop words (stop words that are contentless words, such as "the", "is", "a") contained in the query. Next, the informative terms are determined, that is, terms that do a good job of distinguishing whether a text passage is likely to contain an answer. It should be noted that although the description uses the terms "question" and "answer", the "question" need not be presented in the grammatical sense where a complete sentence needs to be provided. The question need only be a tee, a string of terms (or a passage), the answer to which is also not necessarily a complete sentence in the grammatical sense, but a ten, or string of terms. The results to the query may be documents, such as web page documents, that contain the answer. The answer may include sentences and/or paragraphs of words.

For example, consider that there are presented one hundred questions of the form "Who is X married to?" along with their answers, and for each of these questions, one hundred documents are retrieved, half of which contain the answer and half of which do not. There is now a collection of 5,000 documents that contains the answer to the question of the form "Who is X married to?" (call this the YES set) and 5,000 documents that do not (call this the NO set). If there is a term that appears much more frequently in the YES set than in the NO set, this indicates that this term is a good differentiator between the two sets, implying it is a good indicator that a text passage is likely to contain an answer to the question of this form.

Now given a new question "Who is Y married to?", a set of potential answer passages can be extracted and weighted according to the informative terms found for the class of questions "Who is X married to?". Likewise, the informative terms can be used to help improve passage recall (e.g., instead of initially searching for passages containing "Y" and "married", the system will also look for passages with "Y" and "children", and other related terms). This can be preformed and provided in a query package to at least address a preliminary number or questions that are considered to be commonly asked.

However, a problem with the above approach is that people ask a wide array of questions and ask the same question in many different ways. If the set of question types and the ways people will likely express each question type is known a priori, then question classes can be constructed and the system trained and applied as described above. Where the system does not have the question/answer hierarchy in place, processing a question or passage is problematic.

The problem is solved in accordance with the present invention by automatically building onto the existing abstraction hierarchy. That is, the disclosed novel system is designed to automatically learn what the new relevant question and question classes are, and build onto the existing hierarchy either by starting a new question class branch or extending an existing branch, so that a new question can be mapped into the appropriate question class.

Alternatively, there may be many different question root nodes into which a question may initially be mapped for answer processing. That is, every question processed into the system is mapped into at least one root node. The purpose for providing more than one root node has to do with effecting system performance. Where a single root node that includes all of questions may grow prohibitively large after an extended learning process, multiple smaller hierarchies facilitates faster searching in that only the root node of a hierarchy needs to be analyzed to determine if the question should be mapped into that hierarchy. Other features of such an embodiment are described in greater detail hereinbelow. Where the system includes a plurality of root nodes, or separate question hierarchies, for example, another root node 326, with an associated informative terms list, the system simply examines the informative terms lists at the root level to arrive at some measure of certainty that mapping the question to the abstraction hierarchy 300 results in the question being mapped to the most likely root node that will return the desired answer.

Figure 4:
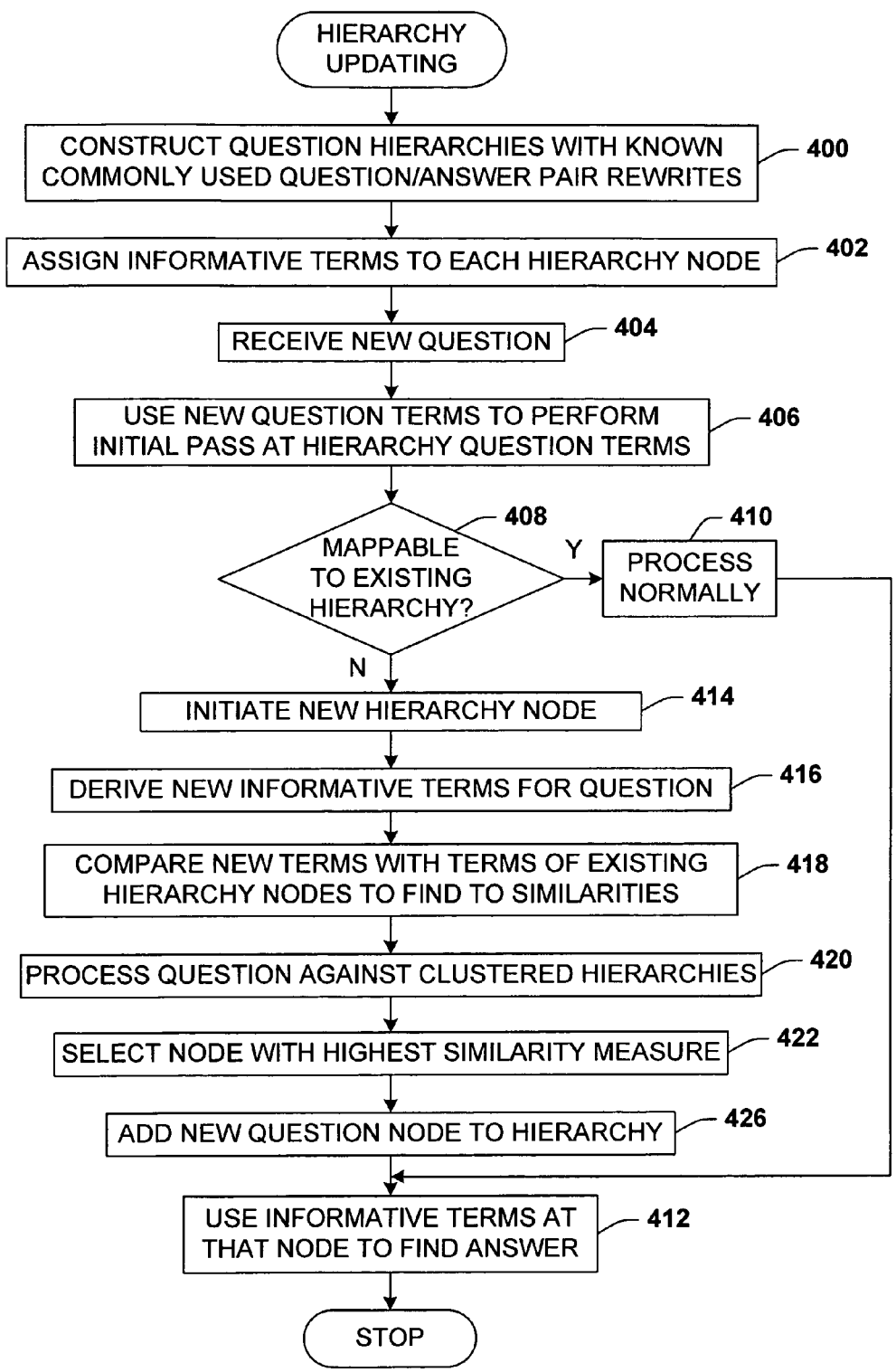
FIG. 4 illustrates a flow chart of the hierarchy generation and update process.

Referring now to FIG. 4, there is illustrated a flow chart of the hierarchy generation and update process. At 400, the process begins where a plurality of question-answer pairs are received and used to generate a number of corresponding question class hierarchies and child nodes. As indicated hereinabove, any conventional clustering technique may be used to cluster the questions in the hierarchy based on the similarity of question terms and/or informative terms. For each such pair, informative terms are found. At 402, the informative terms are assigned to each hierarchy node of the corresponding question of the question/answer pair for which the terms were derived. In run-time, this learned knowledge (i.e., hierarchy structures with question class nodes, child nodes, and informative terms) is used to do effective question answering. At 404, a new question is received for query processing. At 406, one or more text terms of the new question are used to perform an initial pass by comparison to questions at nodes of the question hierarchy.

At 408, the system determines if the new question is mappable into an existing question class hierarchy. If YES, flow is to 410, where the new question is processed normally, as described hereinabove, using question term matching. Note that at 404, informative terms could also be found for the new question, and the new informative terms compared with informative terms of the many nodes to find the most similar node to assign the question. At 412 the informative terms for the associated node are used to find an answer, and the process reaches a Stop block. If NO, the system determines that the new question is not mappable into the hierarchy, and flow is from 408 to 414, where creation of a new question class branch may be started from the root node. Note however, that this may simply be that a new child node is started from an existing parent node within the hierarchy, instead of the new question class node. This means that the new question was deemed by similarity processes to be more similar to the chosen parent node then to other nodes in the hierarchy.

At 416, new informative tens are derived for the new question. The new informative terms may then be used in comparison with existing informative terms of existing nodes to obtain a measure of similarity, as indicated at 418. This may result in further processing occurring at the question class level, at child nodes thereof, or a combination of these node types. In other words, a significant measure of similarity may occur at one of the question class nodes, another significant measure of similarity may occur at a child node of another question class node, and so on. These similarity measures are then ranked to determine to which node the new question will be mapped. Alternatively, or in conjunction therewith, the question terms may be compared directly with questions in the hierarchy to find the most similar question node.

At 420, the question is then processed against the existing hierarchy using the question terms and/or the new informative terms. At 422, the question node with the highest measure of similarity is then selected for providing its informative terms for finding the answer. It is to be appreciated that instead of the node informative terms being used to find the answer, either the new question terms may be used or a mix of the new and node informative terms may be used. This is because the new informative terms may include some terms that are not found in the informative terms of the node. At 426, the new question is then added into the existing question hierarchy at that node, or extending from that node. At 410, either, both, or a combination thereof of the question terms, new question informative terms, and informative terms at that node are used to find an answer. The process then reaches the Stop block.

Where the hierarchy undergoes repeated question appending, the hierarchy may need to be rebuilt. This is to take advantage of clustering techniques to better cluster more similar nodes providing improved efficiency in processing the hierarchy. This also applies to other search structures that may be used, e.g., decision trees. Note that the creation or updating of a hierarchy is important, since an initial training set is unlikely to contain all possible question types. A continual learning technique is provided with the disclosed architecture so that customers may never need to request updates. Using such a novel technique, it is to be appreciated that companies that use the disclosed system may develop unique search databases based strictly upon their own search environment. Furthermore, it is conceivable that the architecture may be enhanced to focus on market sectors through automated learning means before the product is shipped to a customer. For example, if a large customer is to use the product for in-house search purposes, the product may be "burned in" at the vendor by automating the learning process according the particular technology that the customer uses. If the in-house use is for searching a large integrated circuits database, the initial hierarchy can include a multitude of question/answer pairs related to such technology, followed by automated learning burn-in of not-so-straightforward questions and derivation of the informative terms.

Figure 5:
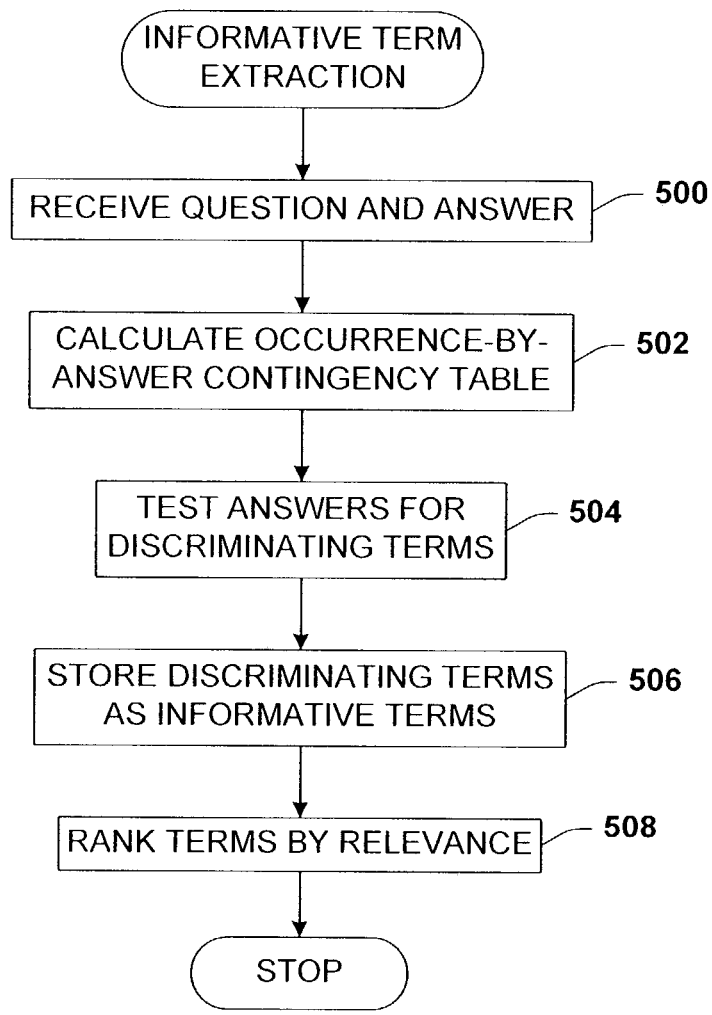
FIG. 5 illustrates a flow chart of a process for extracting informative terms.

Referring now to FIG. 5, there is illustrated a flow chart of a process for extracting informative terms. To extract terms that are relevant to the answer of a question, a Dunning measure is used. At 500, a question/answer pair is received for processing. Given the question and its set of possible answer passages, the Dunning measure calculates a term-by-occurrence contingency table for each term found in these possible answer passages for the question, as indicated at 502. That is, a table of terms is generated that contain terms found in the possible answer passages. The cells in the table record statistics for occurrence of the term in text fragments that contain the answer and the non-occurrence of the term in text fragments that do not contain the answer. At 504, using the table, the answers are tested for discriminating terms. The Dunning measure tests the hypothesis that the statistics for fragments containing the answer are different from the statistics for fragments that do not contain the answer. If this test succeeds, it indicates that the term in question has some value in discriminating between fragments that contain answers from those that do not. The discriminating terms are stored as the informative terms, as indicated at 506. At 508, the output from this process is a list of terms ranked by their relevance to the answer to the question.

The same process can be applied to a group of only questions to obtain a ranked list of corresponding informative terms. Terms highly ranked in this list are expected to be relevant to the answers to all the questions in the group. They will thus be able to discriminate between fragments containing answers to any of the questions from those that do not contain any answers.

Figure 6:
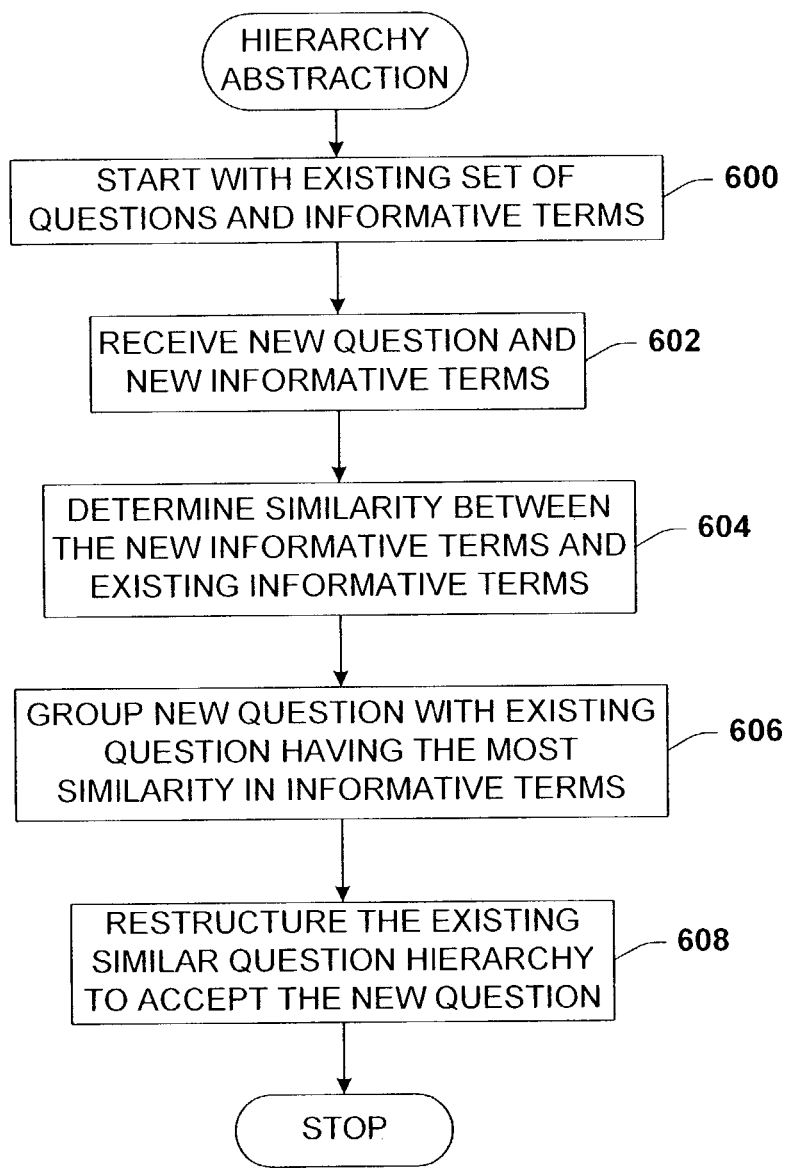
FIG. 6 illustrates a flow chart of a process for abstracting a new hierarchy using a similarity measure.

Referring now to FIG. 6, there is illustrated a flow chart of a process for abstracting a new hierarchy using a similarity measure. The intuitive idea behind the abstraction process is to hypothesize that questions with similar sets of informative terms are themselves similar. Thus, at 600, start with an existing set of questions and corresponding informative terms that are structured as an abstraction hierarchy. At 602, a new question is received, and informative terms for that question are generated. At 604, similarity measures are calculated between the new question and every member in the set of existing questions. This is performed using vectors of the informative terms. At 606, the new question is grouped with the most similar question in the set of questions. At 608, the hierarchy is restructured by replacing the pair of similar questions with a hierarchy structure that represents the pair. The process is then repeated of the next new question that cannot be mapped directly into the existing question hierarchy. The output of this procedure is a hierarchical structure where each node represents one or a group of questions and has a set of informative terms associated with it. In other words, each node is an automatically discovered abstraction over one or more questions.

Various similarity measures may be used to measure the similarity between the two informative-term vectors. These include, but are not limited to, the measures provided below, e.g., the cosine similarity, the Jaccard coefficient, and measures based on the entropy of the informative-term distributions.

An arbitrary set of terms is denoted $T_i = \{t_i\}$, and $W_i = \{w_i\}$ to denote their weights (which are assumed to be normalized and sum to one). The similarity score for two sets of terms is represented by $S(T_i, T_j)$. The entropy of a set of terms is represented by $H(i)$ and the divergence between $T_i$ and $T_j$ is represented by $D(i,j)$. The set of terms common to $T_i$ and $T_j$ is represented by $I(i,j)$, and the union of the two sets is represented by $U(i,j)$. The set of terms obtained by combining two sets of questions i and j is represented by $T_{ij}$.

Cosine similarity is defined by the following:

$$c(T_i, T_j) = \frac{\sum k : t_k \in I(i, j) \omega_{ik} \cdot \omega_{jk}}{\|W_i\| \cdot \|W_j\|}$$

This is the cosine of the angle between the vectors represented by the set of informative terms (the norms are also taken over the intersection of the sets of informative terms). The score is calculated as, $$S(T_i, T_j) = \frac{|I(i, j)|}{|U(i, j)|} \cdot c(T_i, T_j).$$

A Jaccard coefficient equation is used to measure the degree of overlap between two sets, and is defined by, $$S(T_i, T_j) = \frac{|I(i, j)|}{|U(i, j)|}.$$

A weighted Jaccard coefficient equation measures the weighted overlap between two sets. The denominator is a consequence of the assumed normalization of the two vectors. The weighted Jaccard coefficient is defined as, $$S(T_i, T_j) = \frac{\sum k : I_k \in I(i, j)(\omega_{ij} + \omega_{jk})}{2}.$$

A weighted mutual information measure is loosely based on the mutual information of distributions on two random variables X and Y, calculated as $I(X,Y) = H(X) + H(Y) - H(XY)$. The weighted mutual information measure is defined as, $$S(T_i, T_j) = \frac{|I(i, j)|}{|U(i, j)|} \cdot (H(i) + H(j) - H(ij))$$

Divergence measures the sum of the Kullback-Leibler (KL) divergence between the distributions represented by the three sets of informative terms. The rationale is that if these questions belong together in some final abstraction, ij is a better approximation to the distribution of informative terms in that abstraction, than i or j. The divergence measure is defined as, $$S(T_i, T_j) = \frac{|I(i, j)|}{|U(i, j)|} \cdot \frac{1}{(D(ij, i) + D(ij, j))}$$

Relative separation operates according to the intuition that only questions will be combined that after combination give a set of terms that will still be good as separating good snippets from bad snippets, where rs(.) is used as a measure of the effectiveness of a set of terms. The relative separation measure is defined as, $$S(T_i, T_j) = 2rs(ij) - rs(i) - r(j).$$

Figure 7:
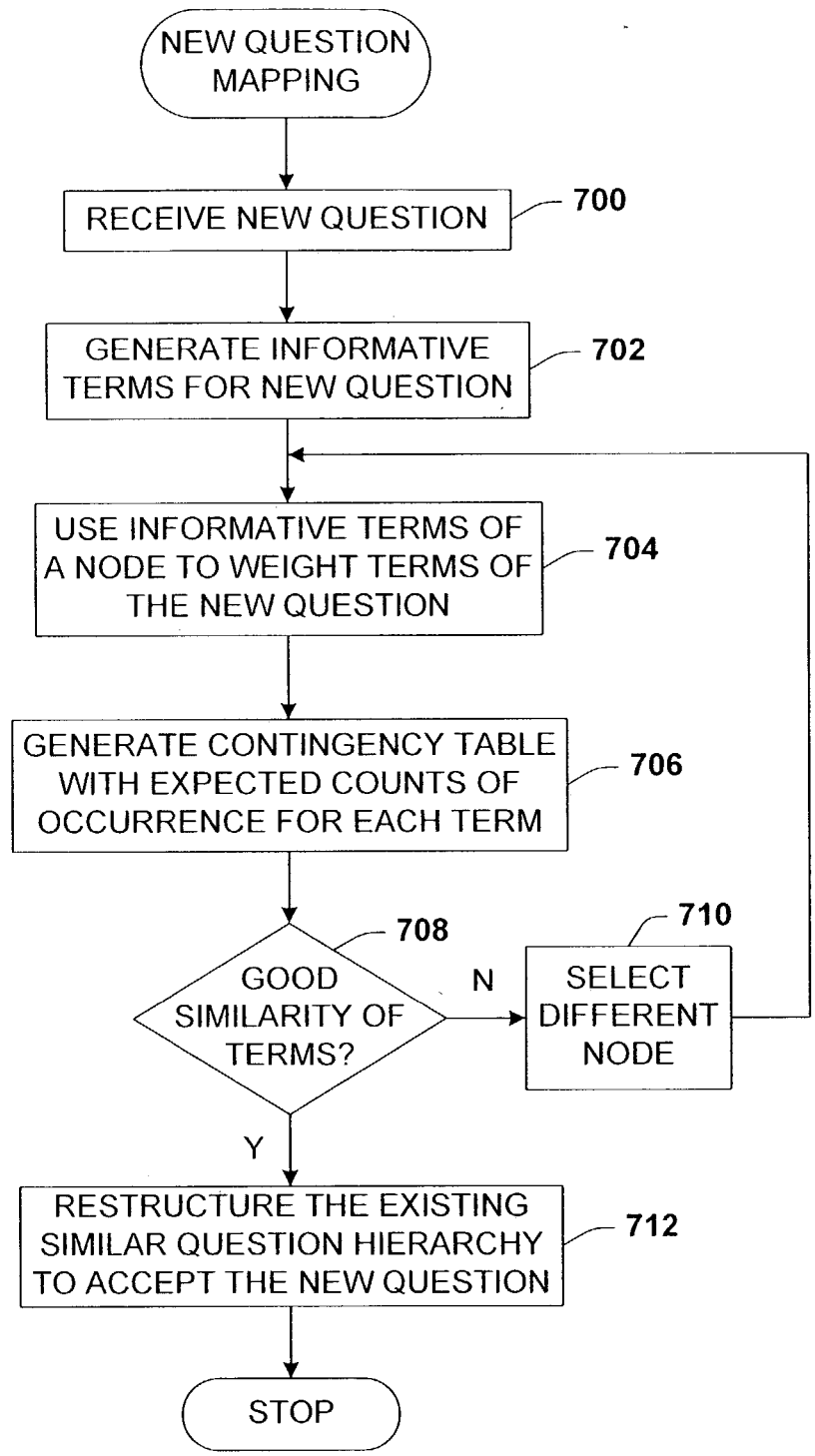
FIG. 7 illustrates a flow chart of a process for mapping a new question into an existing hierarchy when the answer is initially unknown.

Referring now to FIG. 7, there is illustrated a flow chart of a process for mapping a new question into an existing hierarchy when the answer is initially unknown. It is observed that when a set of informative terms is determined for the question, then any similarity measure described above may be used to find the most similar node in the existing hierarchy. The difficulty here is that without knowing the answer, the term-by-occurrence matrix cannot be calculated for use by the Dunning measure to extract informative terms. However, the informative terms at the node can be used to weight the snippets of the question. Using these weights, the contingency table can be filled in for use by the Dunning measure with expected counts of occurrence of each term in snippets with and without answers. Assuming that the node being tested is really the appropriate abstraction to use for this question, the expected counts will be a good approximation to the true counts, and the set of informative terms will be similar to the set of terms at the node. It has been determined empirically that using this process assigns nearly perfect scores to questions for which an exact match exists in the hierarchy.

Thus at 700, a new question is received for processing against an existing question hierarchy. At 702, informative terms are derived for the question. The similarity measure process is used to find the most similar node of the hierarchy. The node already has associated therewith a list of informative terms. At 704, these terms are then used to weight the informative terms generated for the question. At 706, the contingency table is generated with the expected counts of occurrence for each term of the question. At 708, the system determines if a good similarity exists between the terms, as calculated by the similarity measure. If NO, flow is to 710, where a different node is selected, and the flow is back to the input of 704 to redo the weighting process with the terms of the new node. If YES, there is sufficient similarity, the node is selected, and flow is to 712 to restructure the existing hierarchy at that node to accept the new question and its weighted terms.

Figure 8:
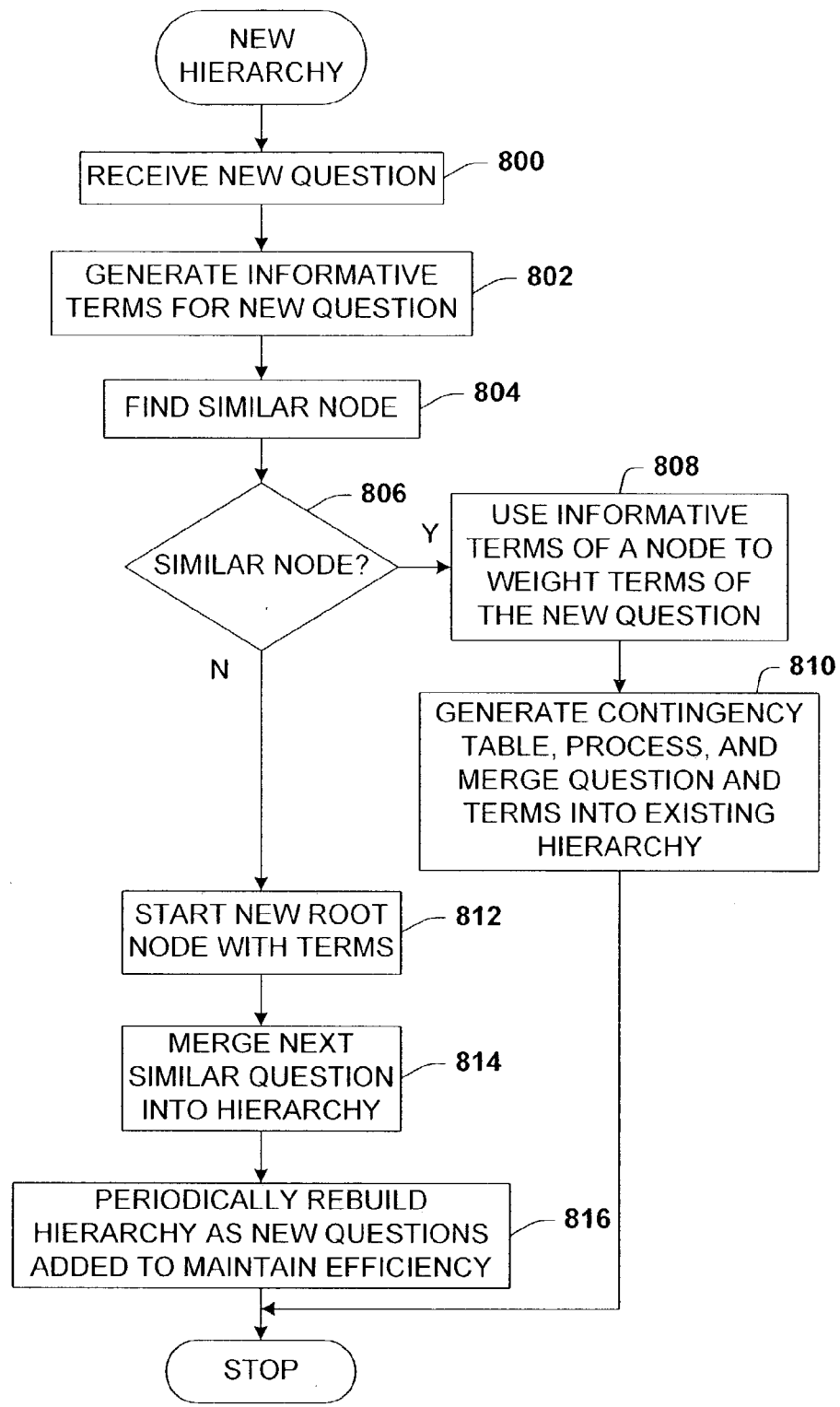
FIG. 8 illustrates a flow chart of a process for the system learning an abstraction hierarchy when no existing hierarchy can be found against which to provide a similarity node for a new question.

Referring now to FIG. 8, there is illustrated a flow chart of a process for the system learning an abstraction hierarchy when no existing node can be found against which to provide similarity for a new question. At 800, a first new question is received for processing. At 802, new informative terms are derived for the first new question. At 804, the system attempts to find a similar node in the existing hierarchy by processing the new informative terms against all existing informative terms of the hierarchy nodes and/or terms of the new question against existing question terms of the hierarchy. At 806, the system determines if a similar node has been found. If YES, flow is to 808 to use the informative terms to weight the informative terms of the question. At 810, the contingency table is generated, the first new question processed, and merged into the similar node of the existing hierarchy. Flow then reaches a Stop block.

If NO, there is no substantially similar node in the existing question hierarchy, and flow is to 812, where the system learns the first new question by starting a new node in the hierarchy with the new informative terms. At this time, the hierarchy may be rebuilt. However, this need not occur until a later time based on different criteria. At 814, if a second new question is presented that is similar to the new node, the second new question and its informative terms are merged into the new hierarchy at that node. At 816, the hierarchy may be periodically rebuilt as questions are added to existing nodes, and new nodes are added. This rebuilding process ensures that the new hierarchy may be processed efficiently, since merging in new questions and nodes ad hoc over time may result in a suboptimal hierarchy if updated incrementally.

The criteria for rebuilding the hierarchy may be based upon a number of different criteria, e.g., the time it takes to process a question to the last node. This time may be calculated as pall of periodical testing of the system hierarchies to ensue that the hierarchies or fragments thereof do not get prohibitively large to negatively impact system performance. Thus if the processing time is too large, the system automatically rebuilds the hierarchy to a more efficient structure.

The criteria may also include simply rebuilding a hierarchy if too many nodes are detected on the overall hierarchy, or on a particular fragment. Other criteria may include the type of hierarchy content. If the content of one hierarchy is deemed to be more important than other hierarchy content, the system may be programmed to more frequently rebuild the associated hierarchies. Another criteria may be to periodically rebuild all hierarchies, or predetermined groups of hierarchies such as in accordance with scheduled system maintenance. This may be performed as part of a system-wide backup process, such that rebuilding is performed just before the backup process commences or just after the backup process completes.

The rebuilding process may also include dividing the existing hierarchy into two hierarchies. This may occur where the system learns that the type of questions coming in for processing is being processed against a particular node for an inordinately high number of times (i.e., a "high frequency" node). Thus, instead of repeatedly processing this type of question from the root node through the various child nodes to the "thigh frequency" node, system performance may be enhanced by separating the hierarchy at that node, and providing a direct jump for the root node to that high frequency node to enhance system processing of the question type. This process may be facilitated by a classifier mechanism described hereinbelow.

It is to be appreciated that over time as many new non-similar and separate question hierarchies are constructed, that one or more of these may converge to a point of similarity to such an extent, as determined by a classification mechanism, that these now similar hierarchies are combined or rebuilt into a new single hierarchy containing these now similar hierarchies.

The invention as described thus far provides that a question can belong to only one group in the abstraction hierarchy. In many cases, however, it makes sense to include a question in several groups, perhaps weighted by the frequency with which each abstraction is seen. Better informative terms may also be obtained by using features other than unigrams that appear in snippets.

Additionally, the disclosed techniques used to abstract questions is useful in the more general context of applying learning techniques to question answering by reducing the problem of data sparsity. Given enough questions to construct a detailed hierarchy, it may be feasible to entirely replace most hand-engineered filtering with automatically learned terms that identify the piece of text that contains the answer. These techniques also have applications in related fields, for example, query expansion in information retrieval.

An extension to this framework combines user-guided learning with periodic reorganization of the hierarchy. In a deployed system, for example, questions could be asked which do not fit anywhere in the existing hierarchy. In this case, the system might ask the user for help about where the question ought to go, or what other terms might be relevant to the answer. Such explicit learning information collected over a period of time may be used to update or reorganize the abstraction hierarchy.

Note also that instead of or in conjunction with the use of informative terms, any conventional technology that operates to determine the distance or similarity of the posed question to or with all of the question hierarchies may be used as a way of linking the posed question to the proper question hierarchy and/or hierarchy node.

The subject invention (e.g., in connection with learning to pair an unusually formatted question with an answer) can employ various artificial intelligence based schemes for carrying out various aspects thereof. For example, a process for learning explicitly or implicitly that when a user is presented with a probable answer, yet eventually chooses another, such learning can be facilitated via an automatic classification system and process. Classification can employ a probabilistic and/or statistical-based analysis (e.g., factoring into the analysis utilities and costs) to prognose or infer an action that a user desires to be automatically performed.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=\text{confidence(class)}$. In the case of text based question/answer system classification, for example, attributes are words or phrases or other data-specific attributes derived from the words (e.g., the presence of key terms), and the classes are questions or answers (e.g., levels of priorities).

A classifier may be used to provide the clustering function mentioned hereinabove. That is, the classifier determines according to some predetermined criteria which existing nodes and/or hierarchies are considered similar to each other relative to other existing nodes and/or hierarchies. The criteria may include using terms of the questions included in the hierarchies, and/or informative terms associated with the hierarchical nodes. The clustering may be based upon the importance of the question as determined by words in the content. Clustering may be used based upon the time the query is posed. For example, if the query is made during a time when transactional queries are typically received, clustering may be invoked to ensure a broader range of potential answers from which to derive a "correct" answer. Similarly, if the question content and the time are both considered, clustering may include either including a larger set of hierarchies of a smaller set. It is to be appreciated that if one or more key words are used in the query, that is, key words known ahead of time by the user to trigger an indicator corresponding to the importance of the query, a specific clustering may be invoked by the classifier to prioritize the query relative to other queries, such as may be used in conjunction with internal financial data queries, personnel or personal information queries, etc.

Figure 9:
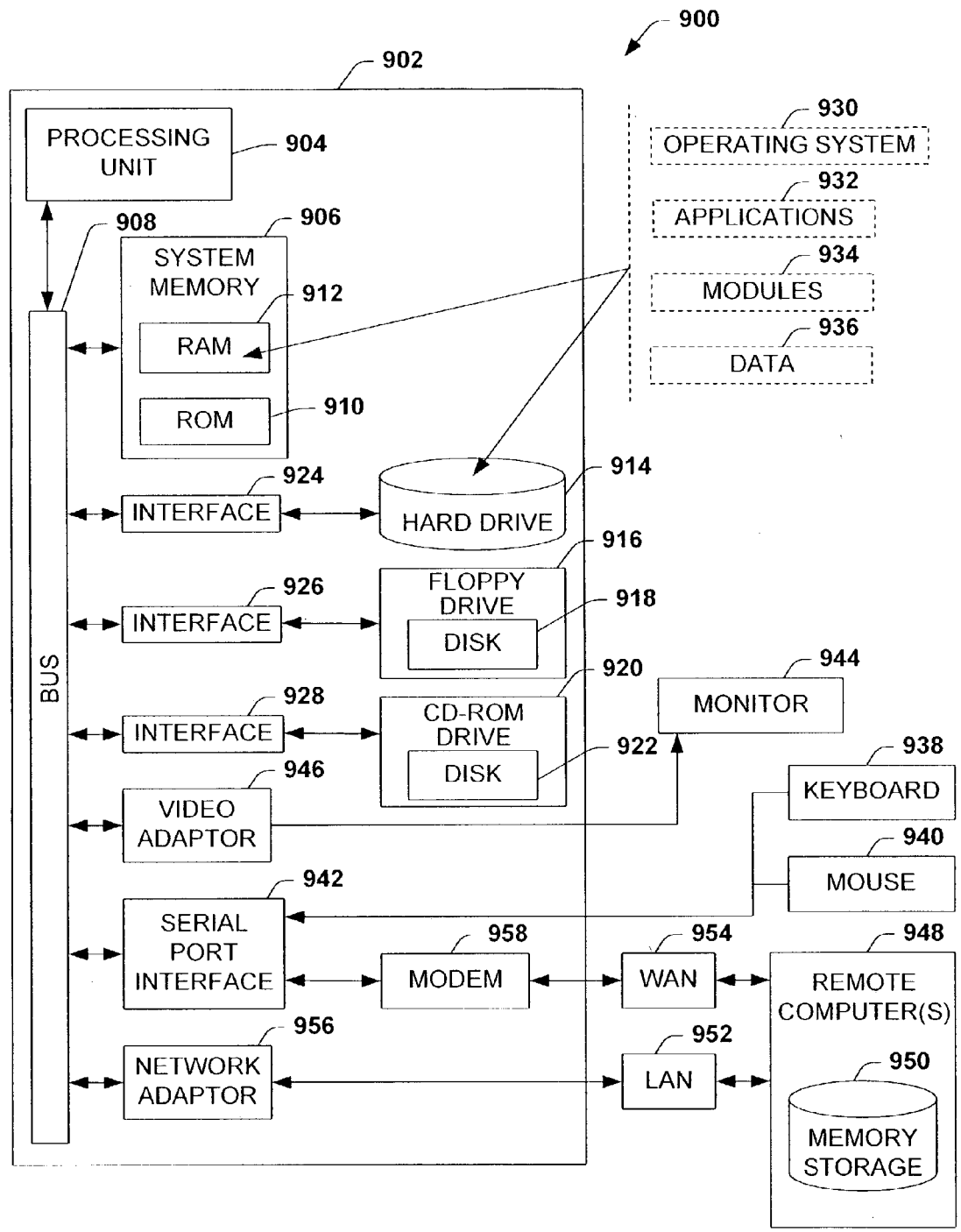
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 9, there is illustrated an exemplary environment 900 for implementing various aspects of the invention includes a computer 902, the computer 902 including a processing unit 904, a system memory 906 and a system bus 908. The system bus 908 couples system components including, but not limited to, the system memory 906 to the processing unit 904. The processing unit 904 may be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up.

The computer 902 further includes a hard disk drive 914, a magnetic disk drive 916, (e.g., to read from or write to a removable disk 918) and an optical disk drive 920, (e.g., reading a CD-ROM disk 922 or to read from or write to other high capacity optical media such as Digital Video Disk (DVD)). The hard disk drive 914, magnetic disk drive 916 and optical disk drive 920 can be connected to the system bus 908 by a hard disk drive interface 924, a magnetic disk drive interface 926 and an optical drive interface 928, respectively. The drives and their associated computer-readable media provide nonvolatile storage of data, data structures, computer-executable instructions, and so forth. For the computer 902, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 912, including an operating system 930, one or more application programs 932, other program modules 934, and program data 936. It is appreciated that the present invention can be implemented with various commercially available operating systems or combinations of operating systems.

A user can enter commands and information into the computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 may be a workstation, a server computer, a router, a personal computer, portable computer, microprocessor-based entertainment appliance, a peer device, or other common network node, and typically includes many or all of the elements described relative to the computer 902, although, for purposes of brevity, only a memory storage device 950 is illustrated. The logical connections depicted include a local area network (LAN) 952 and a wide area network (WAN) 954. Such networking environments are commonplace in offices, enterprise-wide computer networks, intranets and the Internet.

When used in a LAN networking environment, the computer 902 is connected to the local network 952 through a wired or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 typically includes a modem 958, or is connected to a communications server on the LAN, or has other means for establishing communications over the WAN 954, such as the Internet. The modem 958, which may be internal or external and a wired or wireless device, is connected to the system bus 908 via the serial port interface 942. In a networked environment, program modules depicted relative to the computer 902, or portions thereof, may be stored in the remote memory storage device 950. It will be appreciated that the network connections shown are exemplary and other means of establishing a communications link between the computers may be used.

Figure 10:
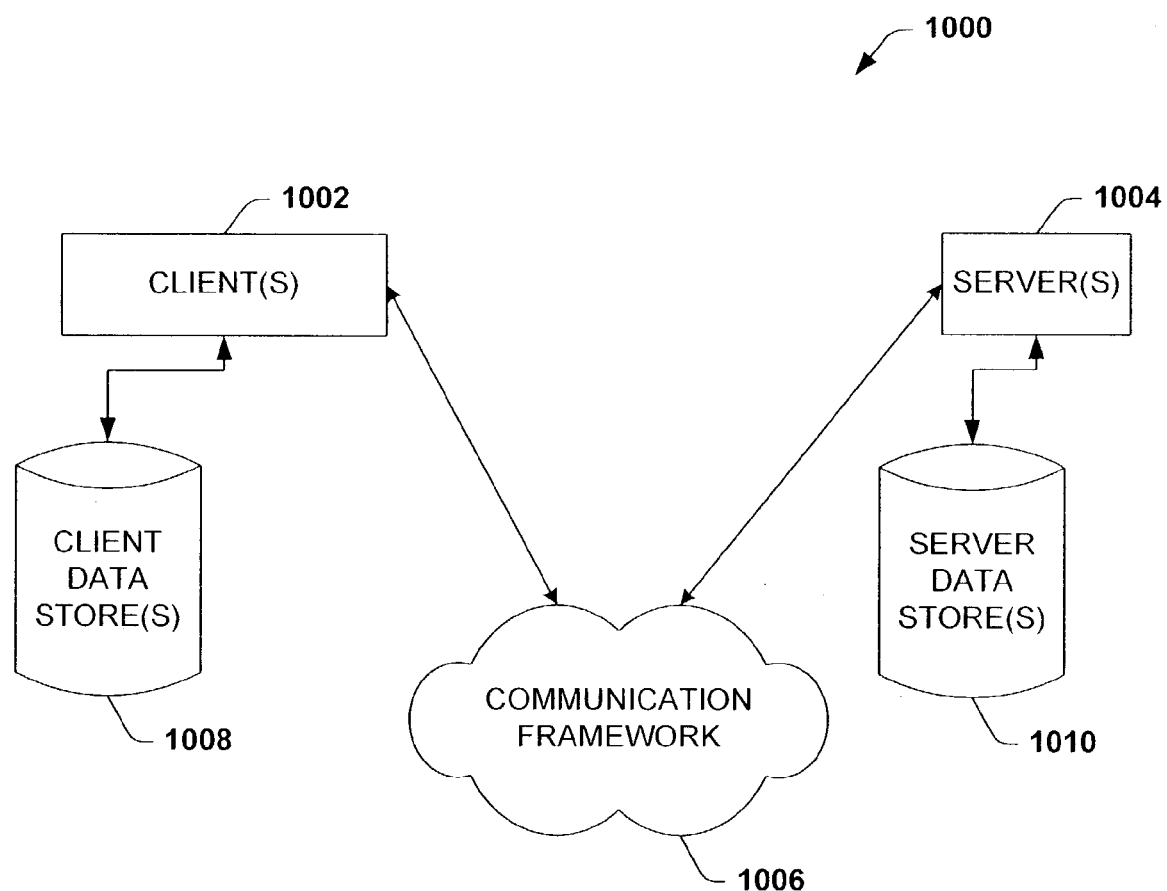
FIG. 10 illustrates a schematic block diagram of an exemplary computing environment in accordance with the present invention.

Referring now to FIG. 10, there is illustrated a schematic block diagram of an exemplary computing environment 1000 in accordance with the present invention. The system 1000 includes one or more client(s) 1002. The client(s) 1002 can be hardware and/or software (e.g., threads, processes, computing devices). The client(s) 1002 can house cookie(s) and/or associated contextual information by employing the present invention, for example. The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications may be facilitated via a wired (including optical fiber) and/or wireless technology. The client(s) 1002 are operably connected to one or more client data store(s) 1008 that can be employed to store information local to the client(s) 1002 (e.g., cookie(s) and/or associated contextual information). Similarly, the server(s) 1004 are operably connected to one or more server data store(s) 1010 that can be employed to store information local to the servers 1004.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   one or more processors; and
   one or more media storage devices storing a plurality of components, each component of the plurality of components comprising instructions that are executable by the one or more processors, the plurality of components including:
   an input component to receive a query;
   an abstraction component to:
      map the query to an abstraction hierarchy according to a distribution of terms found in potential answer passages for the query by calculating a similarity value between the query and each of a plurality of queries in the abstraction hierarchy; and
      group the query with a most similar query in the abstraction hierarchy based on the similarity value; and
   an identification component to map data pairs comprising query-response pairs to the abstraction hierarchy to identify informative terms for a set of nodes in the abstraction hierarchy by determining using a Dunning measure a term-by-occurrence contingency data structure for each term found in possible answer passages for each question in each of the query-response pairs.

2. The system of claim 1, wherein the abstraction hierarchy includes at least one node of the set of nodes that is associated with the query.

3. The system of claim 1, wherein the abstraction hierarchy includes at least one node of the set of nodes associated with an informative term.

4. The system of claim 1, the abstraction component mapping the query into the abstraction hierarchy by comparing informative terms of the query with informative terms of at least one node of the set of nodes.

5. The system of claim 1, the abstraction component mapping the query into the abstraction hierarchy by comparing terms of the query with question terms of at least one question of the abstraction hierarchy.

6. The system of claim 1, wherein the abstraction component restructures the abstraction hierarchy to include the query.

7. The system of claim 1, the abstraction component initiating construction of a new hierarchy when the query cannot be mapped into the abstraction hierarchy.

8. The system of claim 1, the abstraction component clustering the abstraction hierarchy with other hierarchies that are determined to be similar thereto.

9. The system of claim 1, further comprising a classifier component for implicit and explicit learning, the classifier component implemented using a support vector machine.

10. The system of claim 1, further comprising a classifier component for implicit and explicit learning, the classifier component implemented using a decision tree.

11. The system of claim 9, the classifier component prioritizing abstraction hierarchies for clustering.

12. The system of claim 9, the classifier component prioritizing at least one of the query and informative terms of the query for processing.

13. The system of claim 1 further comprising a learning component that learns at least one of a term of the query and informative terms of the query.

14. The system of claim 13, the learning component using at least one of the term of the query and the informative terms of the query to improve the accuracy of an answer for a new query.

15. The system of claim 1, the abstraction component using the informative terms at a node of the abstraction hierarchy to weight one or more terms of the query.

16. A method comprising:
   under control of one or more processors configured with instructions that are executable to perform acts comprising:
   receiving, by the one or more processors, a query;
   processing, by the one or more processors, the query for informative terms;
   mapping, by the one or more processors, the query into an abstraction hierarchy in accordance with a distribution of potential answer terms by calculating a similarity value between the query and each query in the abstraction hierarchy to discriminate between a first set of potential answer terms in the abstraction hierarchy that include answers from a second set of potential answer terms in the abstraction hierarchy that do not include the answers;
   grouping the query with a most similar query in the existing abstraction hierarchy based on the similarity value; and
   mapping data pairs comprising query-response pairs to the abstraction hierarchy to identify informative terms for a set of nodes in the abstraction hierarchy by determining, using a Dunning measure, a term-by-occurrence contingency data structure for each term found in possible answer passages for each question in each of the query-response pairs.

17. The method of claim 16, the abstraction hierarchy including at least one node that is associated with an informative term.

18. The method of claim 16, wherein the query is mapped into the abstraction hierarchy by comparing the informative terms of the query with informative terms of at least one node of the abstraction hierarchy.

19. The method of claim 16, wherein the query is mapped into the abstraction hierarchy by comparing the terms of the query with terms of at least one question of the abstraction hierarchy.

20. The method of claim 16, wherein the query is mapped into the abstraction hierarchy, in response to which the abstraction hierarchy is restructured to include the query.

21. The method of claim 16, further comprising reconstructing, by the one or more processors, the abstraction hierarchy after the query is mapped into the abstraction hierarchy.

22. The method of claim 16, further comprising clustering, by the one or more processors, the abstraction hierarchy with other hierarchies that are determined to be similar thereto such that the query is processed against the clustered hierarchies.

23. The method of claim 16, further comprising mapping, by the one or more processors, data pairs to the abstraction hierarchy to facilitate identifying informative terms for a set of nodes in the abstraction hierarchy.

24. The method of claim 23, the data pairs are question/answer pairs.

25. The method of claim 16, further comprising clustering nodes of the abstraction hierarchy with other nodes that are determined to be similar thereto such that the query is processed against the clustered nodes.

26. The method of claim 16, the abstraction hierarchy including a node associated with at least one query.

27. The method of claim 16, the abstraction hierarchy including a node having associated therewith weighted informative terms that are returned and used by an automatic question answering system to find an answer to the query.

28. A method comprising:
under control of one or more processors configured with instructions that are executable to perform acts comprising:
receiving a question;
extracting a term from the question;
generating a term-by-occurrence contingency data structure of potential answers from a question/answer hierarchy by calculating a similarity value between the question and questions in the question/answer hierarchy, the term-by-occurrence contingency data structure including the potential answers in which the term occurs;
testing the data structure of potential answers for a discriminating term;
storing the discriminating term as an informative term using a Dunning measure;
ranking a plurality of the informative terms by relevance to a potential answer to the question based on the similarity value; and
utilizing one of the informative terms to find the potential answer.

29. The method of claim 28, the discriminating term is found by testing that the statistics of a fragment containing the answer is different from the statistics of a fragment not containing the answer.

30. A memory storage device including instructions executable by one or more processors to perform acts comprising:
receiving an existing abstraction hierarchy of nodes of questions and corresponding informative terms;
receiving a new question;
generating informative terms for the new question;
calculating a similarity value between the new question and every question in the existing abstraction hierarchy, the similarity value discriminating between a first set of questions in the existing abstraction hierarchy that include similar questions to the new question from a second set of questions in the existing abstraction hierarchy that do not include similar questions to the new question;
mapping data pairs comprising question-answer pairs to the existing abstraction hierarchy to identify informative terms for a set of nodes in the abstraction hierarchy by determining, using a Dunning measure, a term-by-occurrence contingency data structure for each term found in possible answer passages for each question in each of the question-answer pairs; and
grouping the new question with the most similar question in the existing abstraction hierarchy based on the similarity value.

31. The memory storage device of claim 30, further comprising rebuilding the existing abstraction hierarchy according to predetermined criteria.

32. The memory storage device of claim 30, further comprising replacing the new question and most similar question with a representative hierarchical structure at that node.

33. A system comprising:
one or more processors; and
one or more media storage devices storing instructions that are executable by the one or more processors to perform acts comprising:
receiving a query;
processing the query to identify informative terms;
mapping the query into an abstraction hierarchy in accordance with a plurality of potential answers for the query;
grouping the query with a most similar query in the abstraction hierarchy based on the similarity value; and
mapping data pairs comprising query-response pairs to the abstraction hierarchy to identify informative terms for a set of nodes in the abstraction hierarchy by determining, using a Dunning measure, a term-by-occurrence contingency data structure for each term found in possible answer passages for each question in each of the query-response pairs.

34. The system of claim 33, the abstraction hierarchy including at least one node that is associated with an informative term.

35. The system of claim 33, wherein the query is mapped into the abstraction hierarchy by comparing the informative terms of the query with informative terms of at least one node of the abstraction hierarchy.

36. The system of claim 33, wherein the query is mapped into the abstraction hierarchy, in response to which the abstraction hierarchy is restructured to include the query.

37. The system of claim 33, further comprising clustering the abstraction hierarchy with other hierarchies that are determined to be similar thereto such that the query is processed against the clustered hierarchies.

38. The system of claim 33, further comprising mapping data pairs to the abstraction hierarchy to identify informative terms for a set of nodes in the abstraction hierarchy.

39. The system of claim 38, the data pairs are query response pairs.

40. The system of claim 38, the data pairs are question/answer pairs.

* * * * *